(12) United States Patent  (10) Patent No.: US 9,227,682 B2
Oettgen                    (45) Date of Patent: Jan. 5, 2016

(54) METHOD FOR MONITORING THE POSTURE OF A MOTORCYCLIST

(75) Inventor: Oliver Oettgen, Beilstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 116 days.

(21) Appl. No.: 13/981,018

(22) PCT Filed: Dec. 5, 2011

(86) PCT No.: PCT/EP2011/071760
§ 371 (c)(1),
(2), (4) Date: Oct. 3, 2013

(87) PCT Pub. No.: WO2012/097909
PCT Pub. Date: Jul. 26, 2012

(65) Prior Publication Data
US 2014/0015662 A1  Jan. 16, 2014

(30) Foreign Application Priority Data
Jan. 20, 2011 (DE) .......... 10 2011 002 920

(51) Int. Cl.
| B60Q 1/00  | (2006.01) |
| B62J 6/00  | (2006.01) |
| B60K 28/04 | (2006.01) |
| B60W 40/08 | (2012.01) |
| B60W 50/16 | (2012.01) |

(52) U.S. Cl.
CPC . B62J 6/00 (2013.01); B60K 28/04 (2013.01); B60W 40/08 (2013.01); B60W 50/16 (2013.01); *B60Y 2200/12* (2013.01)

(58) Field of Classification Search
CPC .......... B60K 35/00; B60K 28/04; A61B 5/18; A61B 5/165; B60N 2002/0268; B60N 2002/0272; B60R 21/01554; B60R 2021/0102; B60R 21/01542; B60R 21/01552; B60W 2540/22; B60W 2040/0818; B60W 50/14; G06K 9/00845; G08B 21/06; B62J 6/00
USPC ............... 340/425.5, 432, 438, 439; 2/69; 224/400, 412, 413; 379/430; 381/376; 296/1.01; 362/157, 190, 191, 103, 105; 280/29, 200, 288.4
See application file for complete search history.

(56) References Cited

U.S. PATENT DOCUMENTS

| 5,690,186 A | 11/1997 | Sugioka et al. |
| 6,392,550 B1* | 5/2002 | Najor .................... 340/576 |
| 6,575,902 B1* | 6/2003 | Burton .................... 600/300 |
| 7,520,358 B2 | 4/2009 | Ehmanns et al. |
| 2004/0007681 A1* | 1/2004 | Moisel et al. ............ 250/559.29 |
| 2007/0131471 A1* | 6/2007 | Ehmanns et al. ............. 180/335 |

(Continued)

FOREIGN PATENT DOCUMENTS

| DE | 10 2004 033 487 | 2/2006 |
| DE | 10 2006 056 094 | 5/2008 |

(Continued)

OTHER PUBLICATIONS

International Search Report, PCT International Application No. PCT/EP2011/071760, dated May 7, 2012.

*Primary Examiner* — Kerri McNally
(74) *Attorney, Agent, or Firm* — Kenyon & Kenyon LLP

(57) ABSTRACT

A method for improving the safety of motorcycling. With the aid of a sensor system, it is monitored if a motorcyclist assumes a predefined posture. Using an algorithm on a control unit, if it is detected that the motorcyclist deviates from the predefined posture for longer than a predetermined period of time, a signal transmitter is activated.

13 Claims, 1 Drawing Sheet

(56) References Cited

U.S. PATENT DOCUMENTS

| | | | |
|---|---|---|---|
| 2008/0169914 A1* | 7/2008 | Albertson et al. | 340/438 |
| 2009/0174560 A1* | 7/2009 | Ahmad et al. | 340/576 |
| 2010/0017090 A1* | 1/2010 | Doi | 701/91 |
| 2010/0204874 A1 | 8/2010 | Oyer | |
| 2010/0222976 A1* | 9/2010 | Haug | 701/70 |
| 2011/0032098 A1* | 2/2011 | Yang | 340/540 |
| 2011/0295466 A1* | 12/2011 | Ostu et al. | 701/45 |
| 2015/0029013 A1* | 1/2015 | Osornio Lopez et al. | 340/438 |

FOREIGN PATENT DOCUMENTS

| | | |
|---|---|---|
| JP | 58-177786 | 10/1983 |
| JP | 62-110091 | 7/1987 |
| JP | 06115469 | 4/1994 |
| JP | 09-323679 | 12/1997 |
| JP | 10-166895 | 6/1998 |
| JP | 2001-030971 | 2/2001 |
| JP | 2002-140800 | 5/2002 |
| JP | 2003-323700 | 11/2003 |
| JP | 2005-280487 | 10/2005 |
| JP | 2007-092264 | 4/2007 |
| JP | 2007-112316 | 5/2007 |
| JP | 2008-132910 | 6/2008 |
| JP | 2008-310766 | 12/2008 |
| JP | 2009-116882 | 5/2009 |

* cited by examiner

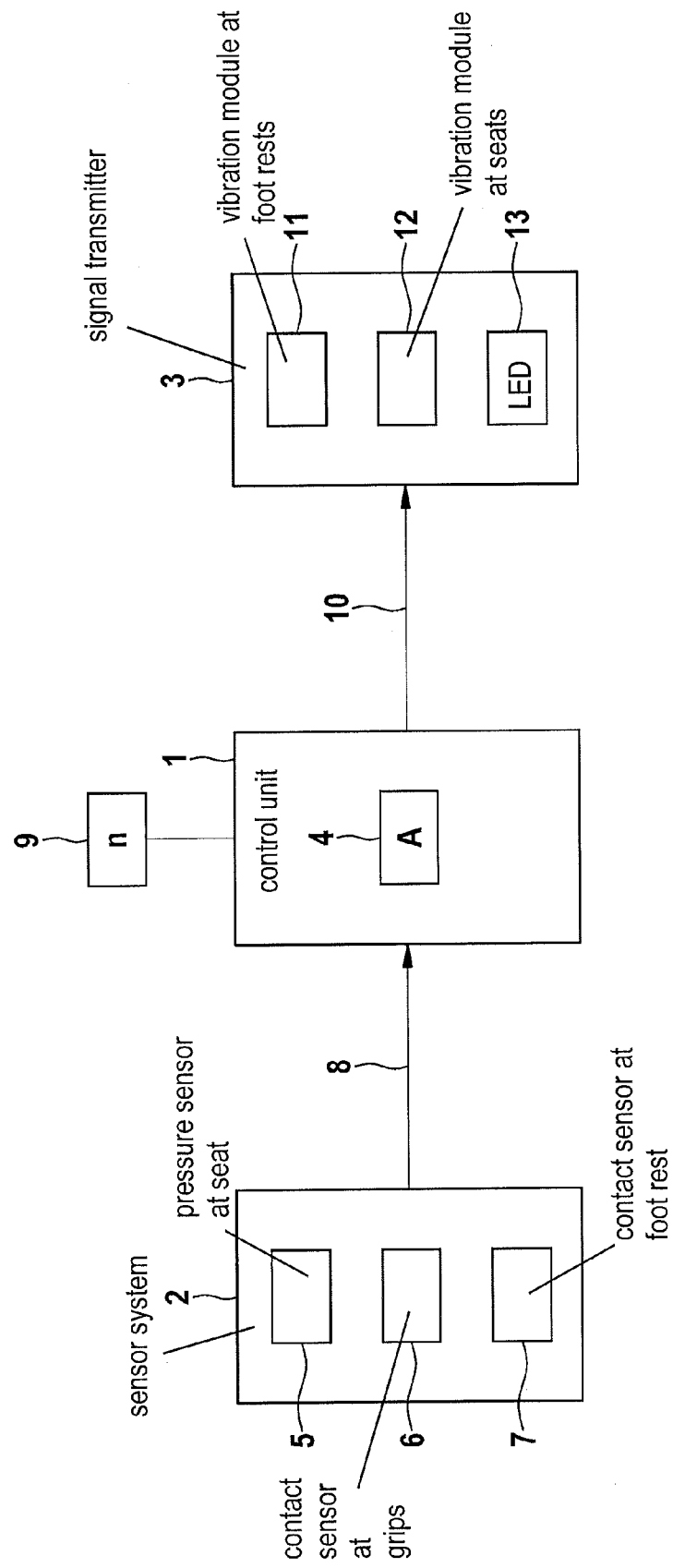

METHOD FOR MONITORING THE POSTURE OF A MOTORCYCLIST

FIELD

The present invention relates to a method for improving the safety of motorcycling.

BACKGROUND INFORMATION

In road traffic, accidents are caused over and over again by a rider's inattentiveness or lack of fitness to drive. Typical reasons for such accidents include, for example, serious fatigue all the way up to microsleep, a health problem such as hypoglycemia, or high emotional stress of the rider. Motorcyclists are put at a particularly high risk by overtiredness or lack of attention.

In motorcycling, apart from the physical state of the rider, the correct posture is also important. If the rider abandons a posture suitable for traffic and rides, for example, with no hands, he may endanger himself and other road users.

SUMMARY

Therefore, an object of the present invention is to provide a system, by which the safety of motorcycling may be improved.

In accordance with the present invention, a sensor system is used to monitor if a motorcyclist assumes a predefined posture. If it is determined that the motorcyclist deviates from the predefined posture for longer than a predetermined period of time, a signal transmitter is activated in order to warn the rider. Indeed, experience has shown that in response to symptoms of fatigue, motorcyclists occasionally carry out tension-reducing movements, such as standing up during the drive, shifting one's weight on the seat, driving with one hand or no hands, stretching out the legs, or shifting the feet away from the designated foot rests. In these phases, the ability to control the motorcycle and, therefore, the driving safety, as well, are reduced. By monitoring the posture and signaling when the correct posture has been abandoned, the motorcyclist is made aware that he is deviating from a posture that is safe in traffic. In this case, he may reassume the posture that is safe in traffic or take a break, if he wishes.

According to a preferred, specific embodiment of the present invention, a contact and/or force sensor system is used as a sensor system. This sensor system may be installed or mounted very easily at different spots on the motorcycle or the equipment of the motorcyclist. In addition, with the aid of this sensor system, it may be determined very easily if the rider is assuming a posture that is safe in traffic.

In principle, the predefined posture is a position in which the rider has effective control over the motorcycle and can react rapidly. It may be characterized, for example, by at least one of the following features: a particular sitting position of the rider, a predefined, uniform weight distribution on the seat, one hand or both hands of the rider are situated on the grips of the handlebars, one foot or both feet of the rider are in contact with the foot rests of the motorcycle, and/or the rider is not in contact with specified locations on the motorcycle. However, postures other than the desired posture may be selected.

According to a preferred, specific embodiment, the signal transmitter outputs an optical and/or acoustic and/or haptically perceptible signal to the rider.

For example, the signal transmitter may generate vibrations at a motorcycle component or at the motorcycle equipment of the rider, such as the motorcycle riding suit.

Alternatively, or in addition, a light-emitting element may output an optical signal. For example, the light-emitting element may be attached to the cockpit of the motorcycle, to the helmet of the rider, or to another component of the motorcycle or the equipment of the motorcyclist. An alternative or additional option is to output a signal over a loudspeaker, which may be situated, e.g., in the helmet of the rider, may be part of handsfree conversing equipment, and/or may be mounted to a different component of the motorcycle or the accessories. Consequently, the form of the signal output may be adapted to different individual needs and different motorcycles and motorcycle equipment.

According to a preferred specific embodiment, vibrations are generated at the throttle grip, at the brake handle, at the foot rests, at the seat, in the motorcycle gloves, at the motorcycle riding suit and/or at the helmet of the motorcyclist. Vibration mechanisms may be integrated at both the motorcycle and the accessories.

In particular, when it is attached to the helmet or the clothing, the signal transmitter is preferably activated via an air interface, such as Bluetooth.

The above-mentioned period of time, for which the rider may deviate from the predefined posture before a warning signal is generated, may vary as a function of the type of deviation. For example, a time period of between 0 s and several seconds may be allowed. According to a specific embodiment of the present invention, it may be provided, e.g., that the rider may remove his hand from the left hand grip for a maximum of 3 s, but only 1 s long from the brake handle (right hand grip), before the signal transmitter is activated, while the removal of both hands from the handlebars immediately results in the activation of the signal transmitter.

The predefined period of time may also be a function of different operating variables of the motorcycle, such as the traveling speed, data regarding the traffic, the weather, and/or the route lying ahead, which the motorcycle will travel. In this manner, for example, the predetermined period of time may be set lower for a higher traveling speed than for a low speed. The warning system may be deactivated when the motorcycle is at a dead stop. For example, if the rider is stopped in front of a red light with the motorcycle, he may remove both hands from the handlebars without activating the signal transmitter.

A device according to the present invention preferably includes a control unit having an algorithm for monitoring the posture of a motorcyclist. The algorithm processes the signals of a corresponding sensor system, and, from them, it determines whether the motorcyclist is assuming the predefined posture. If the algorithm determines that the motorcyclist deviates from the predefined posture during a predetermined period of time, a signal transmitter is activated.

In the following, the present invention is explained in greater detail by way of example, with reference to the FIGURE.

BRIEF DESCRIPTION OF THE DRAWING

FIG. 1 shows a schematic block diagram of a method for monitoring a predefined posture of a motorcyclist.

DETAILED DESCRIPTION OF EXAMPLE EMBODIMENTS

FIG. 1 shows a schematic representation of a system for monitoring a predefined posture of a motorcyclist. The system includes a sensor system 2 for monitoring if the motorcyclist assumes a predefined posture, a control unit 1 which is connected to it and includes an algorithm 4, and a signal transmitter 3. The sensor signals of sensor system 2 are processed and evaluated by algorithm 4. If it is determined that the motorcyclist deviates from a predefined posture longer than a predetermined period of time, control unit 1 activates signal transmitter 3 via a data connection 10.

In the example shown, sensor system 2 includes several pressure or force sensors 5, which are situated at the seat of the motorcycle, contact sensors 6 at the grips of the handlebars, and contact sensors 7 at the foot rests of the motorcycle. At various positions on the seat, force sensors 5 measure the force which is applied to the seat at the respective position. In this manner, the sitting position or a change in the weight distribution may be detected. Contact sensors 6 detect if the hands of the rider are on the grips. The contact sensors 7 at the foot rests detect whether or not the feet of the rider are placed on the foot rests. The data ascertained by sensor system 2 are transmitted to control unit 1 via a data connection 8.

In the exemplary embodiment shown, signal transmitter 3 includes a vibration module 11 at the foot rests and/or a vibration module 12 at the seat, as well as a light-emitting element 13 in the helmet of the motorcyclist. In principle, more or fewer signal transmitters 11 through 13 may also be provided.

In the following, the function of the system represented in FIG. 1 is explained again in light of different examples. For example, if the motorcyclist stretches both legs out and, as a result, no longer touches the foot rests, then, e.g., the vibration module 12 at the seat and the light-emitting element 13 in the helmet of the motorcyclist are activated. If the motorcyclist stands up during the trip and remains standing several seconds, then, e.g., vibration module 11 at the foot rests and light-emitting element 13 in the helmet of the motorcyclist are activated.

The period of time mentioned at the outset, for which the rider may deviate from the predefined posture, may be a function of an operating variable of the motorcycle, e.g., the speed. In this case, the speed is ascertained from the signal of a wheel speed sensor 9. If the rider removes a hand from the handlebars while the motorcycle is traveling, e.g., 25 km/h, signal transmitter 3 is first activated after 4 s, whereas at 60 km/h, it is already activated after 2 s.

What is claimed is:

1. A method for improving the safety of motorcycling, comprising:
    monitoring, using a sensor system, if a motorcyclist on a motorcycle assumes a predefined posture; and
    activating a signal transmitter when it is determined that the motorcyclist deviates from the predefined posture for longer than a predetermined period of time, wherein:
        the monitoring includes identifying which deviation type from a plurality of predetermined deviation types has occurred with respect to the predetermined posture,
        the predetermined period of time varies as a function of the identified deviation type of the motorcyclist; and
        wherein the type of deviation depends on which limb of the motorcyclist has deviated from the predefined postured for the limb.

2. The method as recited in claim 1, wherein the sensor system includes at least one of a contact sensor and a force sensor.

3. The method as recited in claim 1, wherein the predefined posture is characterized by at least one of the following features: a predefined sitting position of the motorcyclist, a predefined weight distribution on a seat of the motorcycle, one hand or both hands of the motorcyclist are situated at grips of handlebars of the motorcycle, one foot or both feet of the rider are in contact with foot rests of the motorcycle, the motorcyclist is not in contact with specified locations on the motorcycle, and legs of the motorcyclist assume a predefined position.

4. The method as recited in claim 1, wherein the signal transmitter outputs at least one of a haptic, an optical and an acoustic signal to the motorcyclist.

5. The method as recited in claim 1, wherein the signal transmitter outputs at least one of: i) vibrations at at least one of a component of the motorcycle, at motorcycle equipment of the motorcyclist, ii) an optical signal in a cockpit, another component of the motorcycle, or at the equipment of the rider, and iii) an acoustic signal in the helmet, via handsfree conversing equipment, or another component of the motorcycle.

6. The method as recited in claim 1, wherein the signal transmitter generates vibrations at least one of: i) at a throttle grip, ii) at a brake handle, iii) at foot rests, iv) at the seat, v) in motorcycle gloves, vi) at the motorcycle riding suit, and vii) at a helmet.

7. The method as recited in claim 1, wherein the signal transmitter is activated via an air interface.

8. The method as recited in claim 7, wherein the signal transmitter is actuated via Bluetooth.

9. The method as recited in claim 1, wherein the predetermined period of time for a maximum deviation from different features of the predefined posture vary.

10. The method as recited in claim 1, wherein the predetermined period of time is a function of at least one of: i) an operating variable of the motorcycle, ii) traffic data, iii) weather data, and iv) data regarding a route lying ahead.

11. The method as recited in claim 1, wherein the predetermined period of time varies as a function of a speed of the motorcycle.

12. A control unit which processes signals of a sensor system of a motorcycle, determines if a motorcyclist assumes a predefined posture, and activates a signal transmitter when the control unit determines that the motorcyclist abandoned the predefined postured for longer than a predetermined period of time, wherein the determining includes identifying which deviation type from a plurality of predetermined deviation types has occurred with respect to the predetermined posture, and wherein the predetermined period of time varies as a function of the identified deviation type of the motorcyclist; and wherein the type of deviation depends on which limb of the motorcyclist has deviated from the predefined posture for the limb.

13. The control unit as recited in claim 12, wherein the predetermined period of time varies as a function of a speed of the motorcycle.

* * * * *